(12) United States Patent
Ogasawara et al.

(10) Patent No.: US 10,551,682 B2
(45) Date of Patent: Feb. 4, 2020

(54) DISPLAY DEVICE

(71) Applicant: SHARP KABUSHIKI KAISHA, Sakai, Osaka (JP)

(72) Inventors: Isao Ogasawara, Sakai (JP); Yoshimasa Chikama, Sakai (JP); Yoshihito Hara, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 164 days.

(21) Appl. No.: 15/754,089

(22) PCT Filed: Aug. 12, 2016

(86) PCT No.: PCT/JP2016/073698
§ 371 (c)(1),
(2) Date: Feb. 21, 2018

(87) PCT Pub. No.: WO2017/033758
PCT Pub. Date: Mar. 2, 2017

(65) Prior Publication Data
US 2018/0239180 A1 Aug. 23, 2018

(30) Foreign Application Priority Data
Aug. 21, 2015 (JP) .................................. 2015-163657

(51) Int. Cl.
*G02F 1/1339* (2006.01)
*G02F 1/1362* (2006.01)
(Continued)

(52) U.S. Cl.
CPC ...... *G02F 1/1339* (2013.01); *G02F 1/136286* (2013.01); *G06F 3/044* (2013.01);
(Continued)

(58) Field of Classification Search
CPC ... G02F 1/1345; G02F 1/13338; G02F 1/1339
See application file for complete search history.

(56) References Cited

U.S. PATENT DOCUMENTS

2005/0211986 A1* 9/2005 Konno ............. G02F 1/134363
257/72
2011/0080173 A1 4/2011 Kim et al.
(Continued)

FOREIGN PATENT DOCUMENTS

JP 2011-082130 A 4/2011
JP 2013-122752 A 6/2013
(Continued)

*Primary Examiner* — Alexander P Gross
(74) *Attorney, Agent, or Firm* — ScienBiziP, P.C.

(57) ABSTRACT

An active matrix substrate includes: first to third lines formed in first to third line layers, respectively, a signal different from a signal supplied to the first lines and the second lines being supplied to the third lines; first connection lines 21*a*, 21*b* that connect the first lines or the second lines with the first terminals; and second connection lines 24*c* that connect the third lines with the second terminals. One of two adjacent ones of the first connection lines is at least partially formed in one of the first line layer and the second line layer, and the other is at least partially formed in the other line layer. In areas that are in the sealing area and where the first connection lines and the second connection lines are superposed, the two of the first connection lines are at least partially superposed when viewed in a plan view.

15 Claims, 13 Drawing Sheets

(51) Int. Cl.
  *G06F 3/041*   (2006.01)
  *G06F 3/044*   (2006.01)
  *G02F 1/1333*  (2006.01)

(52) U.S. Cl.
  CPC ........ *G06F 3/0412* (2013.01); *G02F 1/13338* (2013.01); *G06F 2203/04103* (2013.01)

(56) References Cited

U.S. PATENT DOCUMENTS

| | | |
|---|---|---|
| 2012/0229408 A1 | 9/2012 | Yamamoto |
| 2013/0147724 A1 | 6/2013 | Hwang et al. |
| 2014/0240279 A1 | 8/2014 | Hwang et al. |
| 2015/0084912 A1 | 3/2015 | Seo et al. |
| 2015/0097810 A1 | 4/2015 | Aoki et al. |
| 2015/0219944 A1* | 8/2015 | Mitsumoto ........... G02F 1/1339 349/138 |

FOREIGN PATENT DOCUMENTS

| | | |
|---|---|---|
| JP | 2014-164752 A | 9/2014 |
| JP | 2015-046036 A | 3/2015 |
| JP | 2015-064854 A | 4/2015 |
| JP | 2015-072662 A | 4/2015 |
| JP | 2015-072663 A | 4/2015 |
| WO | 2011-080861 A1 | 7/2011 |
| WO | 2014-024783 A1 | 2/2014 |
| WO | WO-2014024783 A1 * | 2/2014 |

\* cited by examiner

DISPLAY DEVICE

TECHNICAL FIELD

The present invention relates to a display device.

BACKGROUND ART

Patent Document 1 discloses a liquid crystal display device having a touch detection function in which a common electrode is divided into a plurality of pieces, and the plurality of the common electrode pieces are used as touch electrodes. In the liquid crystal display device having a touch detection function disclosed in Patent Document 1, a plurality of common electrode pieces obtained by dividing the common electrode and a controller are connected with each other by a plurality of signal lines, so that the controller detects a touch position.

PRIOR ART DOCUMENT

Patent Document

Patent Document 1: JP-A-2015-64854

SUMMARY OF THE INVENTION

Problem to be Solved by the Invention

A liquid crystal display device has such a configuration that a liquid crystal layer is interposed between a pair of substrates and an outer circumference of the liquid crystal layer is sealed with a sealing member so that the liquid crystal material does not leak out. For forming the sealing member, for example, a photocurable resin that is cured when irradiated with light is used. In an area where the sealing member is formed, at least gate lead-out lines and source lead-out lines are arranged, the gate lead-out lines connecting gate lines for display control with a controller, and the source lead-out lines connecting source lines for display control with a controller.

In the liquid crystal display device having a touch detection function disclosed in Patent Document 1, signal lead-out lines for connecting signal lines for detecting a touch position with a controller are further arranged in the area where the sealing member is formed. In a case where a photocurable resin is used for forming the sealing member, therefore, light-transmitting areas where the gate lead-out lines, the source lead-out lines, and the signal lead-out lines are not arranged become smaller, which in some cases causes the photocurable resin to be irradiated insufficient light at the step of forming the sealing member, and undercured.

It is an object of the present invention to provide a display device in which, in an area where a sealing member is arranged, larger light-transmitting areas can be ensured.

Means to Solve the Problem

A display device in an embodiment of the present invention includes an active matrix substrate; a counter substrate opposed to the active matrix substrate; a display function layer arranged between the active matrix substrate and the counter substrate; and a sealing member that is made of a material that is cured when irradiated with light, and seals the display function layer between the active matrix substrate and the counter substrate. The active matrix substrate includes: first lines formed in a first line layer; second lines formed in a second line layer that is different from the first line layer; third lines formed in a third line layer that is different from the first line layer and the second line layer, a signal that is different from a signal supplied to the first lines and the second lines being supplied to the third lines; first terminals electrically connected to the first lines or the second lines; second terminals electrically connected with the third lines; first connection lines that connect the first lines or the second lines with the first terminals; and second connection lines that connect the third lines with the second terminals. One of two of the first connection lines that are connected, respectively, to two adjacent ones of the first lines or two adjacent ones of the second lines is formed at least partially in one of the first line layer and the second line layer, and the other of the two of the first connection lines is formed at least partially in the other one of the first line layer and the second line layer; the first connection lines and the second connection lines are partially superposed on each other in a sealing area where the sealing member is arranged, when viewed in a plan view; and in areas that are in the sealing area and where the first connection lines and the second connection lines are superposed, the two of the first connection lines are at least partially superposed when viewed in a plan view.

Effect of the Invention

According to the disclosure of the present embodiment, in an area that is in a sealing area and where first connection lines and second connection lines are superposed, two adjacent ones of first connection lines arranged in different layers, respectively, are at least partially superposed on each other when viewed in plan view. This makes it possible to ensure larger light-transmitting areas.

MODE FOR CARRYING OUT THE INVENTION

Figure 1:
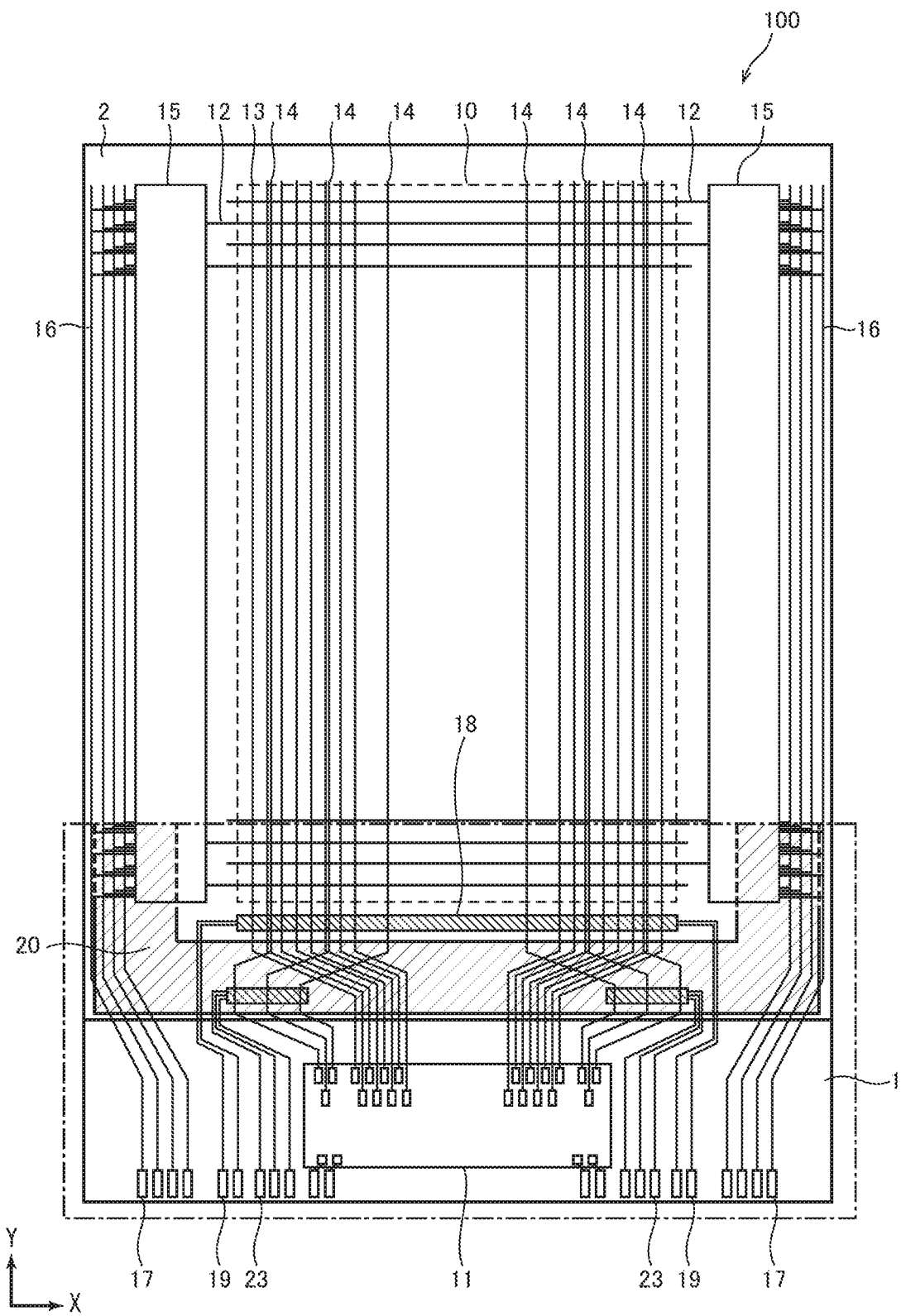
FIG. 1 is a plan view illustrating an exemplary schematic configuration of a display device in Embodiment 1.

A display device in an embodiment of the present invention includes an active matrix substrate; a counter substrate opposed to the active matrix substrate; a display function layer arranged between the active matrix substrate and the counter substrate; and a sealing member that is made of a material that is cured when irradiated with light, and seals the display function layer between the active matrix substrate and the counter substrate. The active matrix substrate includes: first lines formed in a first line layer; second lines formed in a second line layer that is different from the first line layer; third lines formed in a third line layer that is different from the first line layer and the second line layer, a signal that is different from a signal supplied to the first lines and the second lines being supplied to the third lines; first terminals electrically connected to the first lines or the second lines; second terminals electrically connected with the third lines; first connection lines that connect the first lines or the second lines with the first terminals; and second connection lines that connect the third lines with the second terminals. One of two of the first connection lines that are connected, respectively, to two adjacent ones of the first lines or two adjacent ones of the second lines is formed at least partially in one of the first line layer and the second line layer, and the other of the two of the first connection lines is formed at least partially in the other one of the first line layer and the second line layer; the first connection lines and the second connection lines are partially superposed on each other in a sealing area where the sealing member is arranged, when viewed in a plan view; and in areas that are in the sealing area and where the first connection lines and the second connection lines are superposed, the two of the first connection lines are at least partially superposed when viewed in a plan view (the first configuration).

According to the first configuration, two adjacent ones of the first connection lines formed in different line layers are partially superposed when viewed in a plan view, in an area that is in the sealing area and where the first connection lines and the second connection lines are superposed. This therefore makes it possible to ensure large light-transmitting areas where the first connection lines and the second connection lines are not arranged. This makes it possible to prevent the sealing member from becoming undercured.

The first configuration may be further characterized in that, in areas that are in the sealing area and where the first connection lines and the second connection lines are superposed, the two of the first connection lines are superposed over the full width thereof when viewed in a plan view (the second configuration).

According to the second configuration, the two of the first connection lines are superposed over the full width thereof when viewed in a plan view, which makes it possible to ensure larger light-transmitting areas. This makes it possible to more effectively prevent the sealing member from becoming undercured.

The first or second configuration may be further characterized in that the third lines and the second connection lines are at least partially formed with transparent conductive films (the third configuration).

According to the third configuration, the second connection lines are at least partially formed with transparent conductive films, whereby the light-transmitting areas can be made larger.

The third configuration may be further characterized in that the third lines and the second connection lines are at least partially formed with laminates of a metal film and the transparent conductive film, and the metal film has a line width smaller than a line width of the transparent conductive film (the fourth configuration).

According to the fourth configuration, the lines have a laminate structure composed of the metal film and the transparent conductive film, whereby the resistance can be decreased as compared with the configuration in which the lines are formed with transparent conductive films alone. Further, the line width of the metal films is set to be smaller than the line width of the transparent conductive films, whereby translucent parts can be ensured.

Any one of the first to fourth configurations may be further characterized in that, in a space between the sealing area and the second terminals, the second connection lines are at least partially formed in the first line layer or the second line layer (the fifth configuration).

With the fifth configuration, the second connection lines formed in the third line layer can be reconnected with lines in the first line layer or the second line layer.

The fifth configuration may be further characterized in that, in a space between the sealing area and the second terminals, two adjacent ones of the second connection lines are at least partially formed in the first line layer and the second line layer, respectively, so that the second connection lines are at least partially formed in the first line layer and the second line layer alternately (the sixth configuration).

According to the sixth configuration, at least parts of the two adjacent ones of the second connection lines are formed in different line layers alternately. This makes it possible to suppress the occurrence of a short circuit between the second connection lines, as compared with a configuration in which the second connection lines are formed in the same line layer.

The sixth configuration may be further characterized in that the parts of the two adjacent ones of the second connection lines formed in the first line layer and the second line layer alternately are at least partially superposed when viewed in a plan view (the seventh configuration).

With the seventh configuration, the light-transmitting areas can be widened.

The sixth or seventh configuration may be further characterized in that a boundary between the parts of the second connection lines formed in the third line layer and the parts of the same formed in the first line layer or the second line layer is present in the sealing area, or in an area between the sealing area and a display area (the eighth configuration).

According to the eighth configuration, the parts of the second connection line formed in the third line layer are present in an area where the counter substrate is present on the opposite surface side. The possibility of the occurrence of line corrosion, therefore, decreases, even in a case where the third line layer is present in a layer upper with respect to the first line layer or the second line layer, which means that there are fewer protection layers.

The eighth configuration may be further characterized in that the active matrix substrate further includes second connection line switching elements that are formed at the boundary between the second connection lines formed in the third line layer and the second connection lines formed in the first line layer or the second line layer (the ninth configuration).

Any one of the first to ninth configurations may be further characterized in that the active matrix substrate further includes first connection line switching elements electrically connected with the first terminals, and the first connection line switching elements are arranged on a side opposite to the first connection lines with respect to the first terminals, so that the first terminals are interposed therebetween (the tenth configuration).

In the case of the tenth configuration, it is not necessary to arrange the first connection line switching elements in an area near the display area, and this makes it possible to reduce the frame area, as compared with a configuration in which the first connection line switching elements are arranged in the sealing area or on an inner side with respect to the sealing area (on the display area side).

The fifth configuration may be further characterized in that a boundary between the parts of the second connection lines formed in the third line layer and the parts of the same formed in the first line layer or the second line layer is present in an area on a side opposite to a display area with respect to the sealing area (the eleventh configuration).

With the eleventh configuration, a larger area where the first connection lines are formed can be ensured in the sealing area, as compared with a configuration in which the second connection lines formed in the third line layer are reconnected with lines in the first line layer or the second line layer in the sealing area.

The tenth or eleventh configuration may be further characterized in that the active matrix substrate further includes second connection line switching elements electrically connected with the second terminals, and the second connection line switching elements are arranged on a side opposite to the second connection lines with respect to the second terminals, so that the second terminals are interposed therebetween (the twelfth configuration).

With the twelfth configuration, the light-transmitting areas can be made larger, as compared with the configuration in which the second connection line switching elements are formed in the sealing area.

Any one of the first to twelfth configurations may be further characterized in that the active matrix substrate further includes an insulating film provided between the first connection lines and the second connection lines, in an area where the first connection lines and the second connection lines are superposed when viewed in a plan view, and the insulating film is an organic film (the thirteenth configuration).

Any one of the first to thirteenth configurations may be further characterized in that the active matrix substrate further includes a plurality of touch sensor electrodes, and the third lines are connected with the touch sensor electrodes (the fourteenth configuration).

With the fourteenth configuration, larger light-transmitting areas can be ensured in a display device that includes touch sensor electrodes. This makes it possible to prevent the sealing member from becoming undercured.

The first configuration may be further characterized in that the two of the first connection lines have a line width of 3 μm, and the two of the first connection lines are at least partially superposed over 2 μm or more when viewed in a plan view (the fifteenth configuration).

With the fifteenth configuration, large light-transmitting areas enough for preventing the sealing member from becoming undercured can be ensured.

Embodiment

The following description describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of part of constituent members is omitted. Further, the dimension ratios of the constituent members illustrated in the drawings do not necessarily indicate the real dimension ratios.

Embodiment 1

FIG. 1 is a plan view illustrating an exemplary schematic configuration of a display device 100 in Embodiment 1. This display device 100 is a display that has a function of detecting a touch position, which is a display used in, for example, a mobile phone, a portable information terminal, a game machine, a digital camera, a printer, an automotive navigation system, information appliance, or the like.

Figure 5:
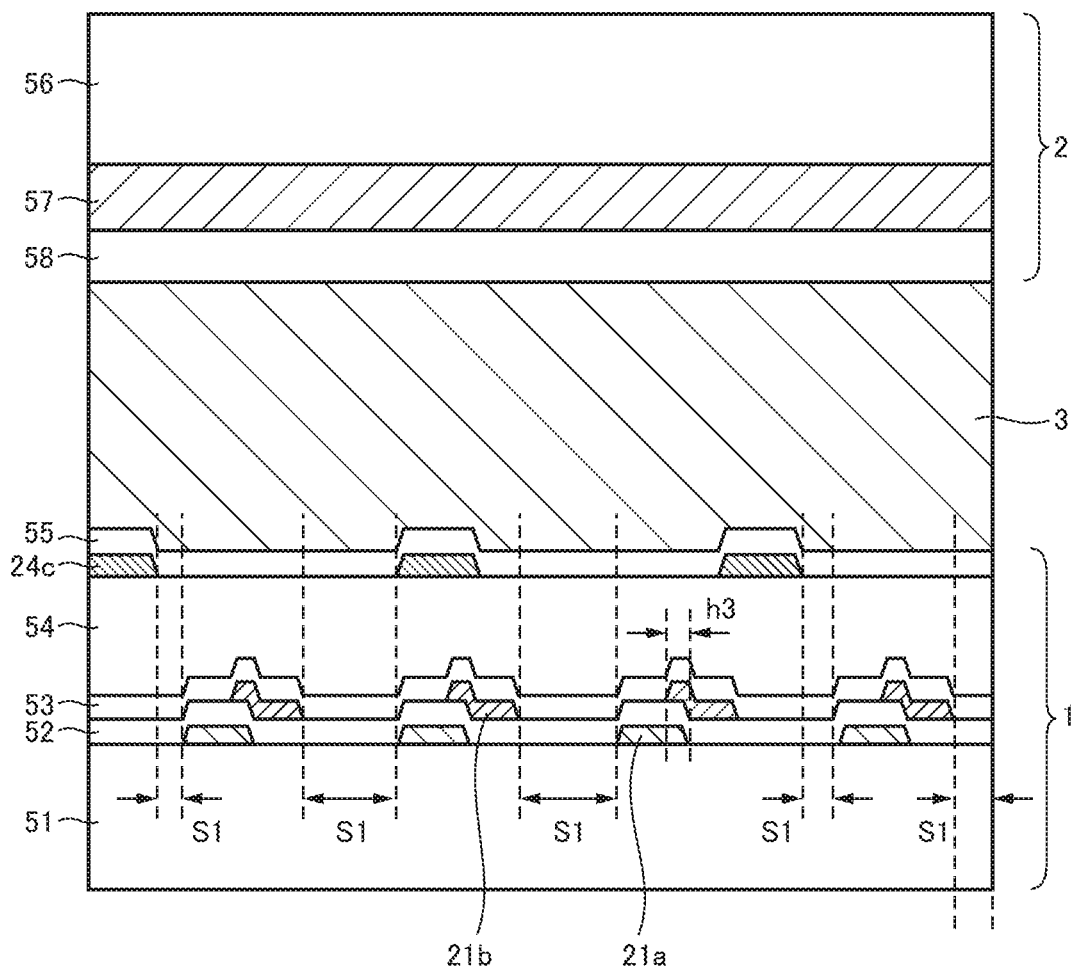
FIG. 5 is a cross-sectional view taken along a cutting-plane line V-V in FIG. 4.

This display device 100 is a liquid crystal display that includes an active matrix substrate 1, a counter substrate 2, a liquid crystal layer (not shown) that is a display function layer interposed between the active matrix substrate 1 and the counter substrate 2, a sealing member 3 that seals the liquid crystal layer between the active matrix substrate 1 and the counter substrate 2 (see FIG. 5). As illustrated in FIG. 1, the display device 100 is in a portrait-oriented rectangular shape as a whole. The long side direction of the display device 100 coincides with the Y axis direction, and the short side direction thereof coincides with the X axis direction.

In FIG. 1, the area surrounded by a dotted line is a display area 10 in which an image can be displayed. The area outside the display area 10 is a non-display area in which an image cannot be displayed.

Each of the active matrix substrate 1 and the counter substrate 2 includes a substantially transparent glass substrate. As illustrated in FIG. 1, the dimension of the long side of the counter substrate 2 is shorter than the dimension of the long side of the active matrix substrate 1. An area on which the counter substrate 2 does not overlap, therefore, exists over a predetermined range in an end part of the active matrix substrate 1, at an end on one side in the long side direction (the end part on the lower side in FIG. 2). In this area, a driving circuit 11 is arranged. The driving circuit 11 is connected to an external control circuit via flexible printed circuits (FPC) that are not illustrated.

On the active matrix substrate 1, a plurality of gate lines (first lines) 12 and a plurality of source lines (second lines) 13 are arranged. Each gate line 12 extends in the X axis direction, and a plurality of the same are arrayed in the Y axis direction. Each source line 13 extends in the Y axis direction, and a plurality of the same are arrayed in the X axis direction. The gate lines 12 are formed in a first line layer, and the source lines 13 are formed in a second line layer that is a layer different from the first line layer. Each of the gate lines 12 and the source lines 13 are formed with, for example, a metal film made of aluminum, copper, titanium, molybdenum, chromium, or the like, or an alloy of any of these, or alternatively a laminate film made of any of these.

As illustrated in FIG. 1, the gate lines 12 and the source lines 13 intersect with each other. In the vicinities of positions at which the gate lines 12 and the source lines 13 intersect, thin film transistors (not shown) as switching elements are arranged. Each gate electrode of the thin film transistor is connected to the gate line 12, and each source electrode thereof is connected to the source line 13. Further, the drain electrode of the thin film transistor is connected to a pixel electrode (not shown).

The display device 100 in the present embodiment is characterized in that the method for driving liquid crystal molecules included in a liquid crystal layer is of a horizontal electric field driving mode, such as the in-plane switching (IPS) mode, or the fringe-field switching (FFS) mode. To realize the method of the horizontal electric field driving mode, pixel electrodes and counter electrodes (also referred to as common electrodes in some cases) for forming electric fields are formed on the active matrix substrate 1.

Figure 2:
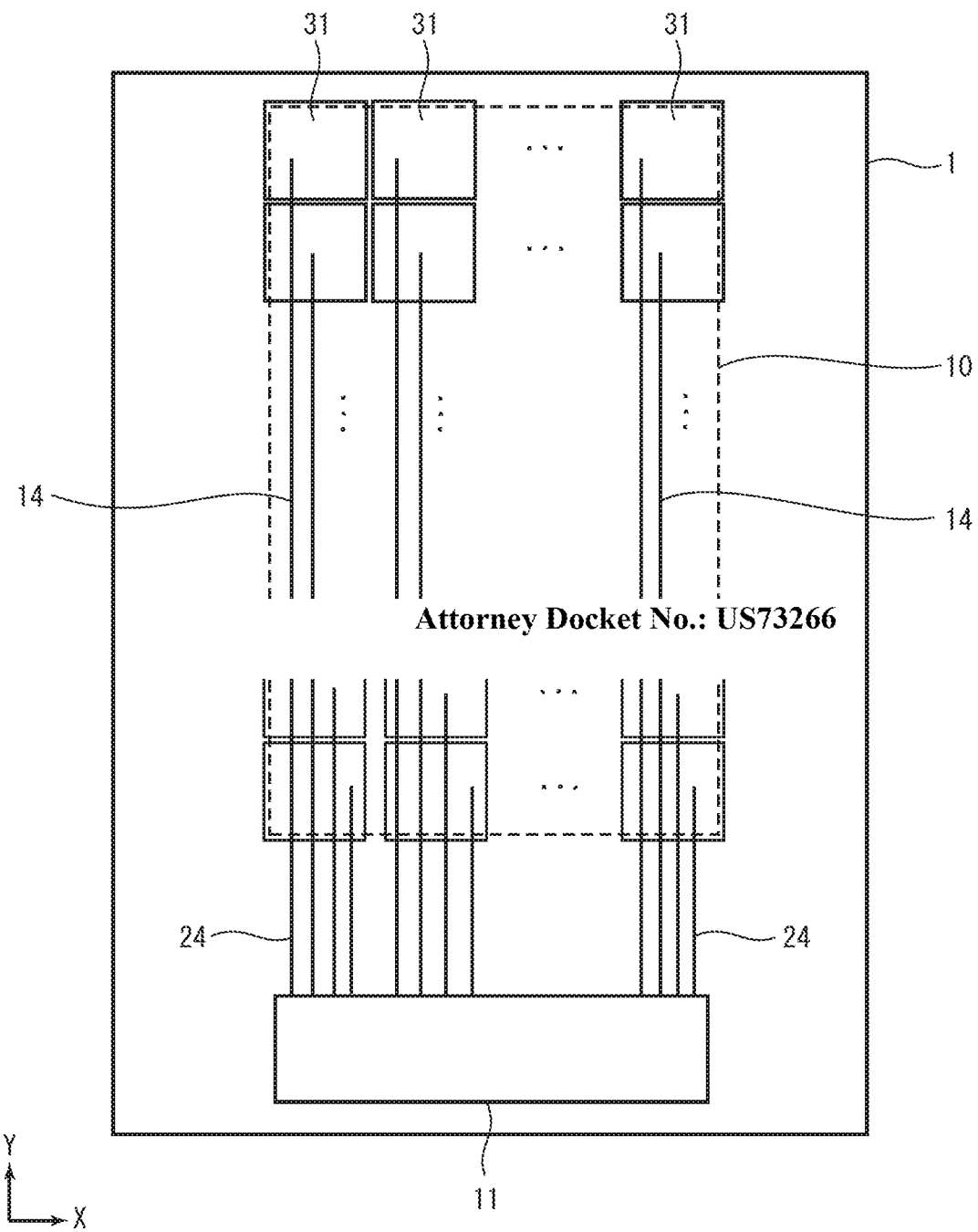
FIG. 2 illustrates an exemplary arrangement of counter electrodes.

FIG. 2 illustrates an exemplary arrangement of counter electrodes 31. Each counter electrode 31 is in a rectangular shape, and a plurality of the same are arrayed in matrix in the display area 10. These counter electrodes 31 also function as touch sensor electrodes for detecting a touch position. Though the illustration is omitted, a plurality of slits for generating a horizontal electric field are provided in the counter electrode 31.

Each counter electrode 31 is connected with the driving circuit 11, through a touch sensor line (third line) 14 and a second connection line 24 extending in the Y axis direction. The touch sensor lines 14 are formed in a third line layer, which is a layer different from the first line layer and the second line layer, and a signal different from those supplied to the gate lines 12 and the source lines 13 is supplied to the touch sensor lines 14. Each of the touch sensor lines 14 and the second connection line 24 are formed with, for example, a metal film made of copper, titanium, molybdenum, aluminum, chromium, or the like, or an alloy of any of these, or alternatively a laminate film made of any of these. In FIG. 2, the second connection line 24 is illustrated as being in a straight-line shape, but actually, as illustrated in FIG. 1, it is not in a straight-line shape.

The following description briefly describes a method for detecting a touch position. A parasitic capacitor is formed between a certain one of the counter electrodes 31 and an adjacent one counter electrode or the like, and when a human finger or the like is brought into contact with a display screen of the display device 100, a capacitor is formed between the human finger or the like and the counter electrode. This causes an electrostatic capacitance to increase. In controlling the touch position detection, the driving circuit 11 supplies a touch driving signal to the counter electrodes 31 through the touch sensor lines 14, and receives the touch detection signal through the touch sensor lines 14. By doing so, the driving circuit 11 detects changes in the electrostatic capacitances, and detects a touch position. This touch position detection method is of a so-called self-capacitance type.

On the active matrix substrate 1, a pair of gate drivers 15 are arranged on both outer sides in the short side direction of the display area 10. Each gate line 12 is connected with either one of the gate drivers 15. The gate drivers 15 are connected with signal electrodes 17 for the driving of the gate drivers (hereinafter referred to as "gate driver driving signal electrodes 17") through gate driver driving lines 16. The gate drivers 15 include scanning circuits that supply a scanning signal input from an external control circuit through the gate driver driving lines 16, to each gate line 12 at predetermined timings, thereby sequentially scanning the gate lines 12.

As described above, the sealing member 3 is provided so as to seal the liquid crystal layer between the active matrix substrate 1 and the counter substrate 2. In the sealing member 3, a photocurable resin that is cured when being irradiated with light is used. The photocurable resin may be a resin that is cured when being irradiated with ultraviolet light, or may be a resin that is cured when being irradiated with visible light. Further alternatively, the resin may be a resin that is cured when being irradiated with light other than ultraviolet light or visible light. The material for the sealing member, however, is not limited to a photocurable resin, but may be, for example, a resin of a thermosetting type. Further alternatively, the sealing member may have both of photocurable properties and thermosetting properties.

Here, an area where the sealing member 3 is arranged is called a "sealing area 20". Though being illustrated only partially in FIG. 1, the sealing area 20 is formed outside the display area 10, enclosing the display area 10.

Figure 3:
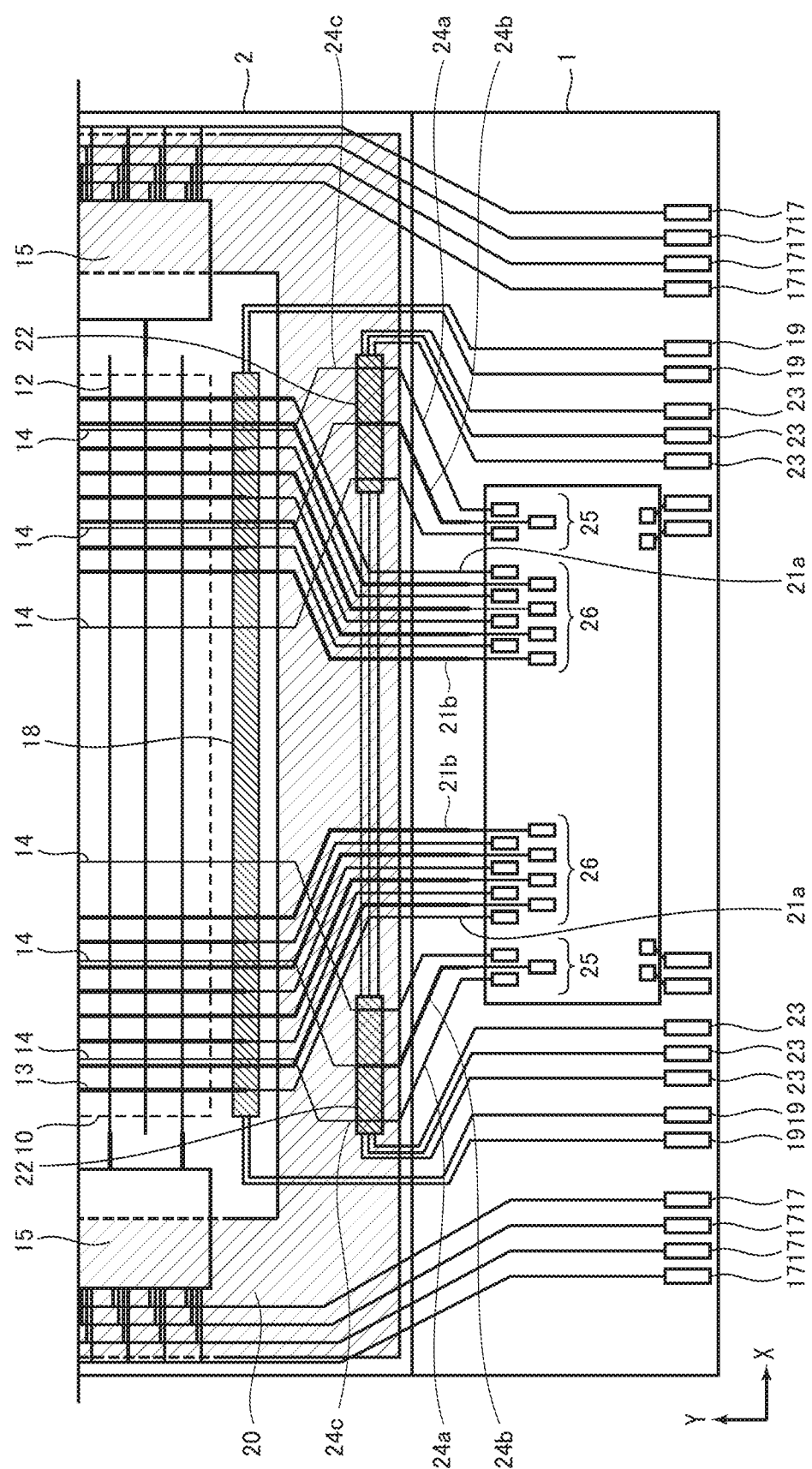
FIG. 3 is an enlarged view illustrating an area surrounded by a dashed dotted line in FIG. 1.

FIG. 3 is an enlarged view illustrating an area surrounded by a dashed dotted line in FIG. 1. On the active matrix substrate 1, a source line inspection pattern 18 is provided. The source line inspection pattern 18 is provided with a plurality of switching elements (inspection TFTs) for controlling the supply of signals to the source lines 13 so as to detect a short circuit or a disconnection of the source lines 13. The source line inspection pattern 18 is connected to terminals 19 to which source line inspection signals are input (hereinafter referred to as "source line inspection signal input terminals 19"). To the source line inspection signal input terminals 19, source line inspection signals are input from an external control circuit.

The source lines 13 are provided inside the display area 10. In the non-display area outside the display area 10, first connection lines 21 are provided. The first connection lines 21 are lines for connecting the source lines 13 and signal output terminals 26 for the source lines (hereinafter referred to as "source line signal output terminals 26") (first terminals) in the non-display area. In other words, the source lines 13 are electrically connected with the source line signal output terminals 26 through the first connection lines 21. The first connection lines 21 are formed with, for example, a metal film made of aluminum, copper, titanium, molybdenum, chromium, or the like, or an alloy of any of these, or alternatively a laminate film made of any of these.

Parts of the first connection lines 21 between the source lines 13 and the source line inspection pattern 18 are formed in the same layer as that of the source lines 13, i.e., the second line layer. On the other hand, among parts of the first connection lines 21 between the source line inspection pattern 18 and the source line signal output terminals 26, the parts of some of the lines are formed in the same layer as that of the source line 13, i.e., the second line layer, and the parts of the other lines are formed in the same layer as that of the gate lines 12, i.e., the first line layer. Here, among the parts of the first connection lines 21 between the source line inspection pattern 18 and the source line signal output terminals 26, the parts of the first connection lines 21 formed in the first line layer are referred to as "first connection lines 21a", and the parts of the first connection lines 21 formed in the second line layer are referred to as "first connection lines 21b". In a case where there is no need to distinguish the first connection lines 21a and the first connection lines 21b, they are referred to generally as the "first connection lines 21".

The first connection lines 21a and the first connection lines 21b are arranged alternately. In other words, one of two adjacent ones of the source lines 13 is connected with the first connection line 21a, and the other of the two is connected with the first connection line 21b. FIGS. 1 and 3, for convenience sake, illustrate adjacent ones of the first connection lines 21a and the first connection line 21b as if they are in a state of being separated from each other, but as is described below, in the present embodiment, adjacent ones of the first connection lines 21a and the first connection lines 21b are partially superposed on each other when viewed in a plan view.

On the active matrix substrate 1, touch sensor inspection patterns 22 are provided. In the present embodiment, the touch sensor inspection patterns 22 are arranged at two positions, but the positions are not limited to two positions. Each touch sensor inspection pattern 22 is provided with a plurality of switching elements (inspection TFTs) for controlling the signal supply to the touch sensor lines 14 so as to detect a short circuit or a disconnection of the touch sensor lines 14. The touch sensor inspection patterns 22 are connected with terminals 23 to which touch sensor inspection signals are input (hereinafter referred to as "touch sensor inspection signal input terminals 23"). To the touch sensor inspection signal input terminals 23, touch sensor inspection signals are input from an external control circuit. It should be noted that, in each of the touch sensor inspection patterns 22 at the two positions, lines for inputting the same touch sensor inspection signal may be connected with one another. Such a configuration allows a difference between the transmission properties of the touch sensor inspection signals to be suppressed at the touch sensor inspection patterns 22 at two positions, thereby reducing display irregularities during inspection. Further, this achieves an effect of causing charges to be easily dispersed so that specific portions of the touch sensor inspection patterns 22 and the counter electrodes 31 should not be charged. Here, these connection lines are formed using a third line layer, whereby these lines can be formed without any additional step in the manufacture process.

The touch sensor lines 14 are provided in the display area 10. In the non-display area, which is outside the display area 10, the second connection lines 24 are provided. The second connection lines 24 are lines for connecting the touch sensor lines 14 and signal output terminals 25 for touch sensor (hereinafter referred to as "touch sensor signal output terminals 25") (second terminals) in the non-display area. In other words, the touch sensor lines 14 are electrically connected with the touch sensor signal output terminals 25 via the second connection lines 24.

Parts of the second connection lines 24 between the touch sensor lines 14 and the touch sensor inspection patterns 22 are formed in the same layer as that of the touch sensor lines 14, i.e., the third line layer. On the other hand, among parts of the second connection lines 24 between the touch sensor inspection patterns 22 and the touch sensor signal output terminals 25, the parts of some of the lines are formed in the same layer as that of the gate lines 12, i.e., the first line layer, and the parts of the other lines are formed in the same layer as that of the source lines 13, i.e., the second line layer. Here, among the parts of the second connection lines 24 between the touch sensor inspection patterns 22 and the touch sensor signal output terminals 25, the parts of the second connection lines 24 formed in the first line layer are referred to as "second connection lines 24a", and the parts of the second connection lines 24 formed in the second line layer are referred to as "second connection lines 24b". Further, the parts of the second connection lines 24 formed in the third line layer are referred to as "second connection lines 24c". In a case where there is no need to distinguish the second connection lines 24a, the second connection lines 24b, and the second connection lines 24c, they are referred to generally as the "second connection lines 24".

In other words, in the touch sensor inspection patterns 22, the second connection lines 24c connected with the touch sensor lines 14 are reconnected to the second connection lines 24a formed in the first line layer, or to the second connection lines 24b formed in the second line layer.

In FIG. 3, the lines formed in the first line layer, the lines formed in the second line layer, and the lines formed in the third line layer are distinctly illustrated by widths of the lines. More specifically, the illustration is made in such a manner that the line width increases in the ascending order of the lines formed in the third line layer, the lines formed in the first line layer, and the lines formed in the second line layer.

The second connection lines 24a and the second connection lines 24b are alternately arranged. In other words, one of two adjacent second connection lines 24c is connected with the second connection line 24a, and the other of the two is connected with the second connection line 24b.

The connection lines such as the first connection lines 21 and the second connection lines 24 are called lead-out lines in some cases.

As illustrated in FIG. 3, the touch sensor inspection patterns 22 are formed in the sealing area 20, that is, a region where the counter substrate 2 opposed to the active matrix substrate 1 is present. In other words, the second connection lines 24c formed in the third line layer are not formed in a region where the counter substrate 2 is not present. On the other hand, the second connection lines 24a formed in the first line layer and the second connection lines 24b formed in the second line layer are formed also in the region where the counter substrate 2 is not present, as illustrated in FIG. 3.

As is described below with reference to FIG. 5, the third line layer in which the second connection lines 24c are formed is positioned farthest from the glass substrate of the active matrix substrate 1, farther as compared with the first line layer and the second line layer. Since a second insulating film 55 (see FIG. 5) is the only insulating film that protects the second connection lines 24c, there is a concern that corrosion of lines could occur if the second connection lines 24c are formed in the region where the counter substrate 2 is not present. Further, in a case where a driving circuit 11 is mounted and thereafter the driving circuit 11 has to be replaced due to a defect or the like thereof, the second connection lines 24c, if formed in the region where the counter substrate 2 is not present, tend to be broken.

In the present embodiment, however, since the second connection lines 24c are not formed in the region where the counter substrate 2 is not present, the occurrence of defects such as corrosion of lines or breakage as described above can be suppressed. Further, since adjacent ones of the second connection lines 24c are reconnected alternately to the second connection lines 24a and the second connection lines 24b that are formed in the different layers, respectively, the line widths and the spaces between lines can be increased as compared with a case where the second connection lines 24c are reconnected to only the second connection lines 24a, or the second connection lines 24b. This makes it possible to reduce disconnections or short circuits, thereby increasing the yield at the time of manufacture.

On the other hand, since the second connection lines 24a formed in the first line layer and the second connection lines 24b formed in the second line layer are protected by the first insulating film 53, the flattening film 54, and the second insulating film 55 (see FIG. 5), it is less likely that defects such as corrosion of lines or breaking as described above would occur to the second connection lines 24a and 24b, even if they are formed in the region where the counter substrate 2 is not present.

The reconnection of the second connection lines 24c to the second connection lines 24a or the second connection lines 24b is made in the sealing area 20, but it may be made between the sealing area 20 and the display area 10.

Further, the configuration may be such that the second connection lines 24c formed in the third line layer are reconnected only to the second connection lines 24a formed in the first line layer, or alternatively, may be such that the same are reconnected only to the second connection lines 24b formed in the second line layer. The layer of the lines to which the second connection lines 24c are reconnected can be appropriately determined depending on the number of the second connection lines 24, the size of the driving circuit 11, and the outer shape of the liquid crystal display (the size of the frame area). For example, as is described later with reference to FIG. 5, since there are more protection layers for the second connection lines 24a formed in the first layer, as compared with the second connection lines 24b formed in the second line layer, the concern of corrosion of lines and the like can be reduced, in a case where the second connection lines 24c are reconnected only to the second connection lines 24a.

As described above, the touch sensor inspection patterns 22 are formed in the sealing area 20, that is, the area where the counter substrate 2, opposed to the active matrix substrate 1, is provided. In an area on the counter substrate 2 side opposed to the area where the touch sensor inspection patterns 22 are formed, a black matrix is provided. When the touch sensor lines 14 are inspected regarding a disconnection or a short circuit, the driving circuit 11 has not been mounted yet, and a plurality of switching elements (inspection TFTs) included in the touch sensor inspection patterns 22 are not covered with a driving circuit chip. In a case where, therefore, a black matrix is not provided in an area on the counter substrate 2 side, opposed to the area where the touch sensor inspection pattern 22 is formed, there is a possibility that external light is incident on the switching elements (inspection TFTs) and causes properties of the switching elements to fluctuate, depending on inspection environments. In the present embodiment, however, the black matrix is provided in the area on the counter substrate 2 side, opposed to the area where the touch sensor inspection pattern 22 is formed, which makes it possible to suppress fluctuations of the properties of the switching elements during inspection.

As illustrated in FIG. 3, in the sealing area 20, the first connection lines 21a and 21b, and the second connection lines 24c intersect with each other. In other words, in the sealing area, the first connection lines 21a and 21b, and the second connection lines 24c, are partially superposed on each other when viewed in a plan view.

Figure 4:
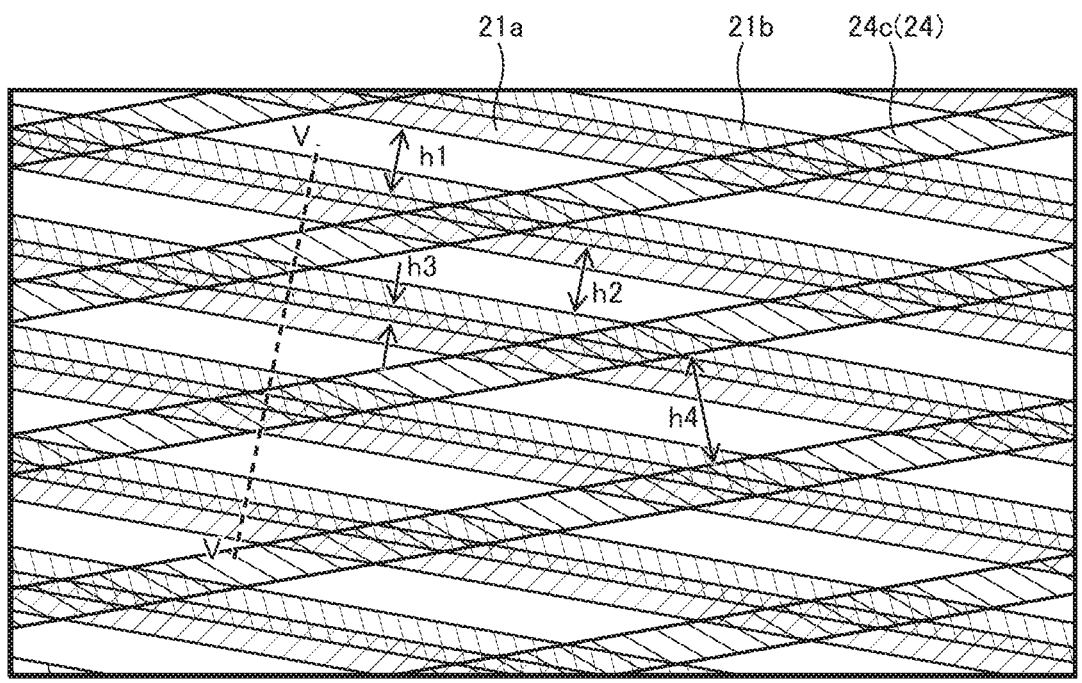
FIG. 4 is an enlarged plan view illustrating an area that is in a sealing area and that includes areas where first connection lines and second connection lines are partially superposed when viewed in a plan view.
Figure 4:
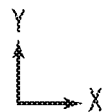

FIG. 4 is an enlarged plan view illustrating an area that is in a sealing area 20 and that includes areas where the first connection lines 21a and the first connection lines 21b are partially superposed on the second connection lines 24c when viewed in a plan view. In the present embodiment, in an area that is in the sealing area 20 and in which the first connection lines 21a and the first connection lines 21b are partially superposed on the second connection lines 24, the first connection lines 21a and the first connection lines 21b, which are formed in different layers, respectively, are partially superposed on each other when viewed in a plan view.

Here, the first connection line 21a has a line width of 3 µm, and a space h1 between the same and an adjacent one of the first connection lines 21a has a width of 6 µm. Further, the first connection line 21b has a line width of 3 µm, and a space k2 between the same and an adjacent one of the first connection lines 21b has a width of 6 µm. The first connection line 21a and the first connection line 21b are parallel, and are partially superposed on each other. An overlap width h3 over which the first connection line 21a and the first connection line 21b are superposed is 1 µm. Besides, the second connection lines 24c has a line width of 3 µm, and the space h4 between adjacent ones of the second connection lines 24c has a width of 9.5 µm.

The overlap width h3 over which the first connection line 21a and the first connection line 21b are superposed, however, may be less than 1 µm, or may be 1 µm or more and less than 3 µm. Further, the line widths of the first connection lines 21a and the first connection lines 21b do not have to be equal. Still further, the line widths of the first connection lines 21a, the first connection line 21b, the second connection lines 24c, and spaces between adjacent ones of the lines, are not limited to the values described above.

FIG. 5 is a cross-sectional view taken along a cutting-plane line V-V in FIG. 4. On the glass substrate 51 of the active matrix substrate 1, the first connection lines 21a are formed. The first connection lines 21a are formed in the same layer as that of the gate lines 12 and the gate electrodes, i.e., the first line layer.

The gate insulating film 52 is formed so as to cover the first connection lines 21a. The gate insulating film 52 is made of, for example, silicon nitride (SiNx), or silicon oxide (SiOx).

On the gate insulating film 52, the first connection lines 21b are formed. The first connection lines 21b are formed in the same layer as that of the source lines 13 and the source electrodes, that is, the second line layer.

As described above, the first connection lines 21a and the first connection lines 21b partially overlap with each other when viewed in a plan view, and the overlap width h3 is, for example, 1 µm.

The first insulating film 53 is formed so as to cover the first connection lines 21b. The first insulating film 53 is made of, for example, silicon nitride (SiNx) or silicon oxide (SiOx).

On the first insulating film 53, the flattening film 54, which is an insulating film, is formed. The flattening film 54 is an organic film, and is made of, for example, an acrylic resin material having photosensitivity. The flattening film 54 is preferably made of a material having a low relative dielectric constant (for example, 2 to 4), and is formed to be thick (for example, 1 to 4 µm), so that the electrostatic capacitances between the flattening film 54 and the first connection lines 21a, the first connection lines 21b, as well as the second connection lines 24 can be reduced.

On the flattening film 54, the second connection lines 24c are formed.

The second insulating film 55 is formed so as to cover the second connection lines 24c. The second insulating film 55 is made of, for example, silicon nitride (SiNx) or silicon oxide (SiOx). In the display area 10, the counter electrodes 31 are formed on the second insulating film 55. The counter electrodes 31 are connected with the touch sensor lines 14 through contact holes formed in the second insulating film 55. Further, the pixel electrodes formed in the display area 10 are formed on the flattening film 54, and are covered with the second insulating film 55, as is the case with the second connection lines 24c.

On the second insulating film 55, the sealing member 3 is provided. In FIG. 5, the illustration of spacers arranged in the sealing area 20 is omitted.

The counter substrate 2 is provided on a side opposite to the active matrix substrate 1, with the sealing member 3 being interposed therebetween. On the glass substrate 56 of the counter substrate 2, the black matrix 57 is formed, and an overcoat layer 58 is formed between the black matrix 57 and the sealing member 3. In the display area 10 of the counter substrate 2, color filters (not shown) are formed.

As described above, in the sealing member 3 in the present embodiment, a photocurable resin that is cured when being irradiated with light is used. Light is projected form the glass substrate 51 side of the active matrix substrate 1. Since the first connection lines 21*a*, the first connection lines 21*b*, and the second connection lines 24 are formed with opaque metal films having low light permeability, light projected from the glass substrate 51 side reaches the sealing member 3 through areas S1 in which none of the first connection lines 21*a*, the first connection lines 21*b*, and the second connection lines 24 is formed. As illustrated in FIG. 5, since the first connection lines 21*a* and the first connection lines 21*b* partially overlap, the areas S1 (hereinafter referred to as light-transmitting areas S1) in which none of the first connection lines 21*a*, the first connection lines 21*b*, and the second connection lines 24 is formed, as compared with the configuration in which the first connection lines 21*a* and the first connection lines 21*b* do not overlap. This makes it possible to irradiate the sealing member 3 with sufficient light, thereby preventing the sealing member 3 from being undercured at the time of manufacture of the display device 100.

Figure 6:
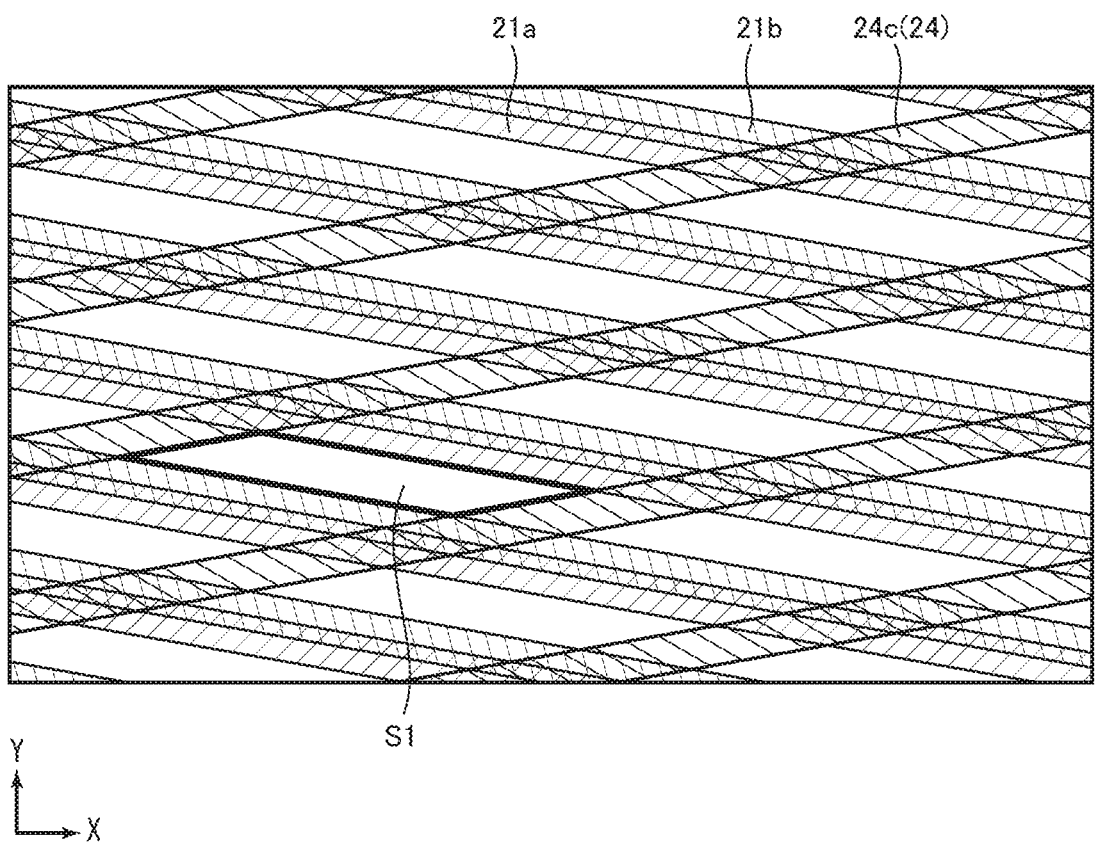
FIG. 6 is a plan view illustrating a light-transmitting area in the present embodiment.
Figure 13:
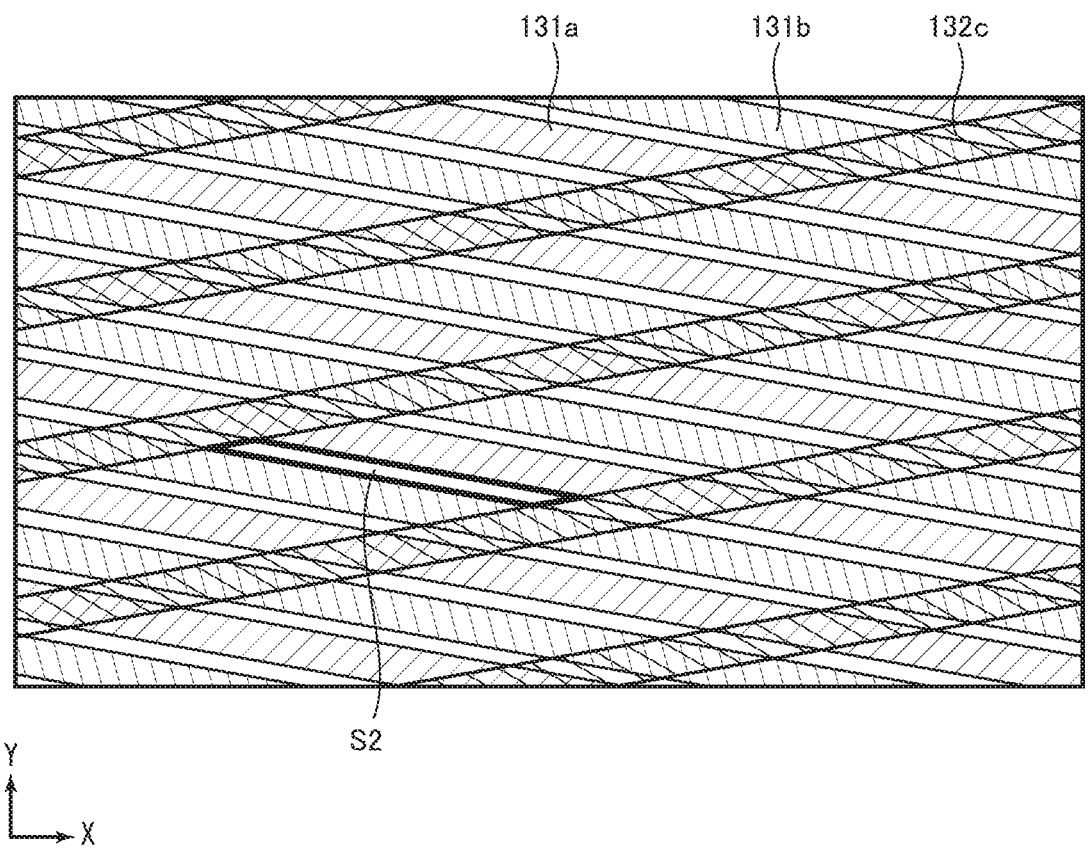
FIG. 13 is a plan view illustrating a light-transmitting area in a comparative configuration in which first connection lines of two types, which are formed in different layers, respectively, do not overlap when viewed in a plan view.

The following description describes difference between the width of the light-transmitting area S1 in the present embodiment in which the first connection lines 21*a* and first connection lines 21*b*, formed in different layers, respectively, overlap partially with each other when viewed in a plan view, and the width of a light-transmitting area S2 in a comparative configuration in which the first connection lines 21*a* and the first connection lines 21*b* do not overlap with each other when viewed in a plan view. FIG. 6 is a plan view illustrating the light-transmitting area S1 in the present embodiment. Further, FIG. 13 is a plan view illustrating a light-transmitting area S2 in a comparative configuration in which first connection lines 131*a* and 131*b* do not overlap with each other when viewed in a plan view. The light-transmitting area S2 is an area surrounded by the first connection line 131*a*, the first connection line 131*b*, and the second connection lines 132*c*.

In the case of the comparative configuration illustrated in FIG. 13, the ratio of the light-transmitting areas S2 in the sealing area is about 25%. On the other hand, in the case of the configuration of the present embodiment illustrated in FIG. 6, the ratio of the light-transmitting areas S1 in the sealing area 20 is about 33%. This value of 33% is equal to the ratio of the light-transmitting areas in the comparative configuration illustrated in FIG. 13 from which the second connection lines 132*c* are removed, and this does not cause the sealing member 3 to become undercured. This was confirmed by the inventors of the present application.

More specifically, in the case of the display device 100 in the present embodiment, even if it is such a configuration that the touch sensor lines 14 and the second connection lines 24 as constituent members for detecting a touch position are arranged on a display device having no touch detection function, the ratio of the light-transmitting area in the sealing area 20, which is equal to the ratio of the same in the display device having no touch detection function, can be maintained. This makes it possible to prevent the sealing member 3 from becoming undercured, thereby providing a high-quality display device.

In order to ensure a wide light-transmitting area S1 as compared with the comparative configuration, it is only required that those adjacent in a plan view of the first connection lines 21*a* and the first connection lines 21*b* at least partially overlap with each other. When the active matrix substrate 1 is manufactured, however, in some cases, a misalignment of more or less 1 μm occurs to the second line layer, in which the first connection lines 21*b* are formed, with respect to the first line layer, in which the first connection lines 21*a* are formed. Further, in some cases, the line width of the first connection lines 21*a* and the first connection lines 21*b* varies by more or less 1 μm. Such a misalignment or the variation of the line width becomes noticeable in a large mother glass plate from which a plurality of liquid crystal panels can be obtained at the time of manufacture of display devices.

In a case where the overlap width h3 of the first connection lines 21*a* and the first connection lines 21*b* is less than 1 μm, there is a possibility that a sufficient light-transmitting area cannot be ensured due to misalignment, variation of the line width, and the like described above. The overlap width h3 of the first connection lines 21*a* and the first connection lines 21*b*, therefore, is preferably at least 1 μm. More preferably, the overlap width h3 of the first connection lines 21*a* and the first connection lines 21*b* is 2 μm or more.

Incidentally, as illustrated in FIG. 3, the sealing area 20 includes areas where the second connection lines 24*a* formed in the first line layer and the second connection lines 24*b* formed in the second line layer are formed. More specifically, in the sealing area 20, in the areas between the touch sensor inspection patterns 22 and the touch sensor signal output terminals 25, the second connection lines 24*a* and the second connection lines 24*b* are formed. This area may be caused to have such a configuration that adjacent ones of the second connection lines 24*a* and the second connection lines 24*b* are partially superposed. With this configuration, the light-transmitting areas S1 can be made further wider, whereby it is possible to more effectively prevent the sealing member 3 from becoming undercured.

Embodiment 2

Figure 7:
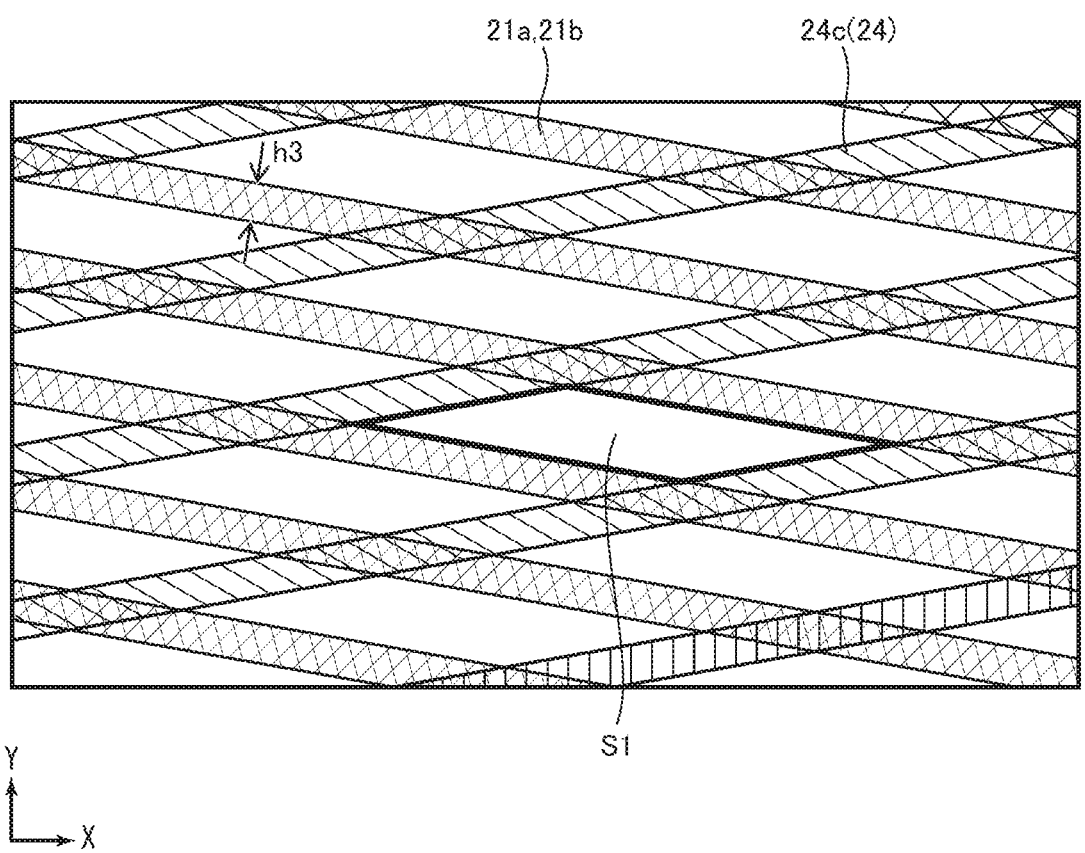
FIG. 7 is an enlarged plan view illustrating, in a sealing area, an area that includes areas where first connection lines and second connection lines are partially superposed, when viewed in a plan view, in Embodiment 2.

FIG. 7 is an enlarged plan view illustrating, in a sealing area 20, an area that includes areas where the first connection lines 21*a* and 21*b*, and the second connection lines 24*c* are partially superposed, when viewed in a plan view, in Embodiment 2. In Embodiment 2, the first connection lines 21*a* and the first connection lines 21*b* connected to adjacent ones of the source lines 13, respectively, completely overlap with each other. In other words, the line width of the first connection lines 21*a* and the first connection lines 21*b* is 3 μm, which is the same as in Embodiment 1, but the overlap width h3 of the first connection lines 21*a* and the first connection lines 21*b* is 3 μm.

The ratio of the light-transmitting areas S1 in the sealing area 20 in this case is about 50%. More specifically, according to Embodiment 2, the light-transmitting area S1 can be widened as compared with the configuration in Embodiment 1, whereby it is possible to more effectively prevent the sealing member 3 from becoming undercured.

Incidentally, according to the results of experiments performed by the inventors of the present application, if the ratio of the light-transmitting areas S1 is at least 33%, the sealing member 3 does not become undercured. The configuration in which the first connection line 21a and the first connection line 21b connected to two adjacent ones of the source lines 13, respectively, overlap completely, therefore, makes it possible to maintain the ratio of the light-transmitting areas to 33%, while increasing the line width of the first connection lines 21a and the first connection lines 21b. By increasing the line width of the first connection lines 21a and the first connection lines 21b, the occurrence of a disconnection to the first connection lines 21a and the first connection lines 21b can be suppressed, whereby the yield at the time of manufacture can be improved. Instead of increasing the line width of the first connection lines 21a and the first connection lines 21b, the line width of the second connection lines 24 may be increased.

Further, as illustrated in FIG. 3, the sealing area 20 includes areas where the second connection lines 24a formed in the first line layer and the second connection lines 24b formed in the second line layer are formed. This area may be caused to have such a configuration that the second connection lines 24a and the second connection lines 24b connected to two adjacent ones of the second connection lines 24c completely overlap each other. With this configuration, the light-transmitting areas S1 can be made further wider, whereby it is possible to more effectively prevent the sealing member 3 from becoming undercured.

Embodiment 3

Figure 8:
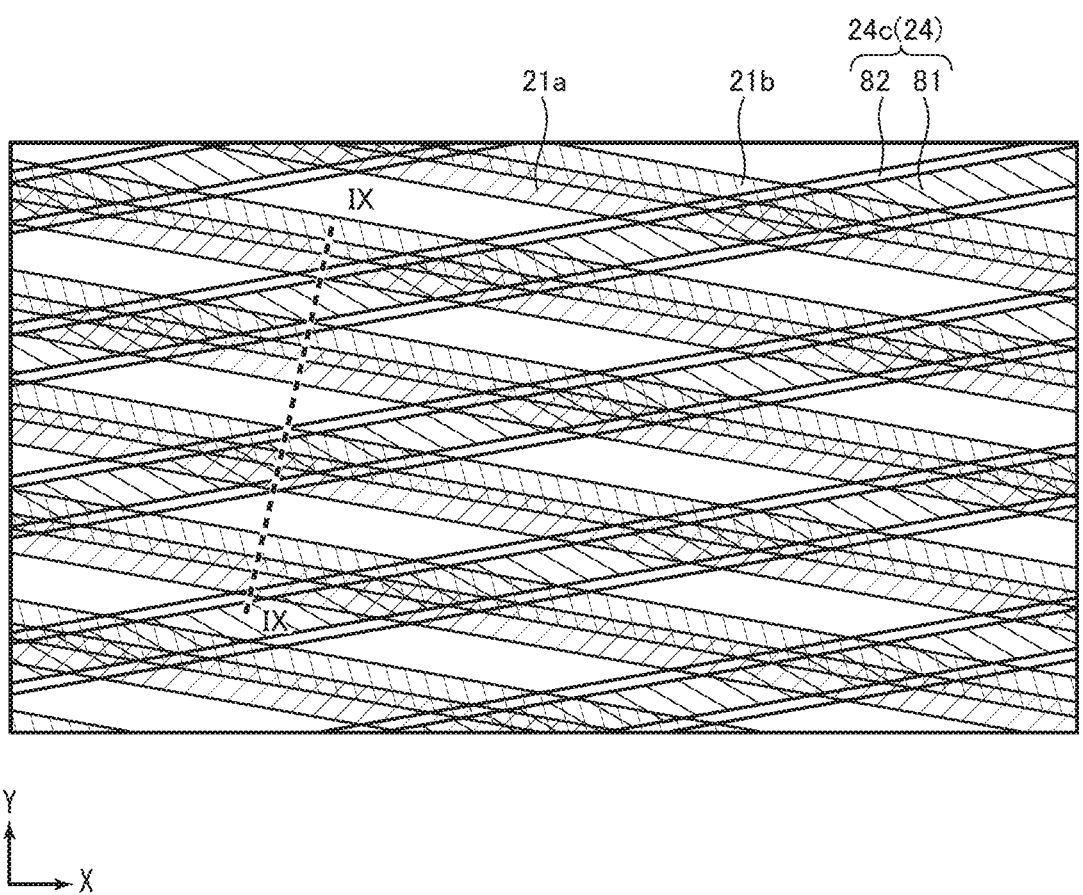
FIG. 8 is an enlarged plan view illustrating, in a sealing area, an area that includes areas where first connection lines and second connection lines are partially superposed, when viewed in a plan view, in Embodiment 3.
Figure 9:
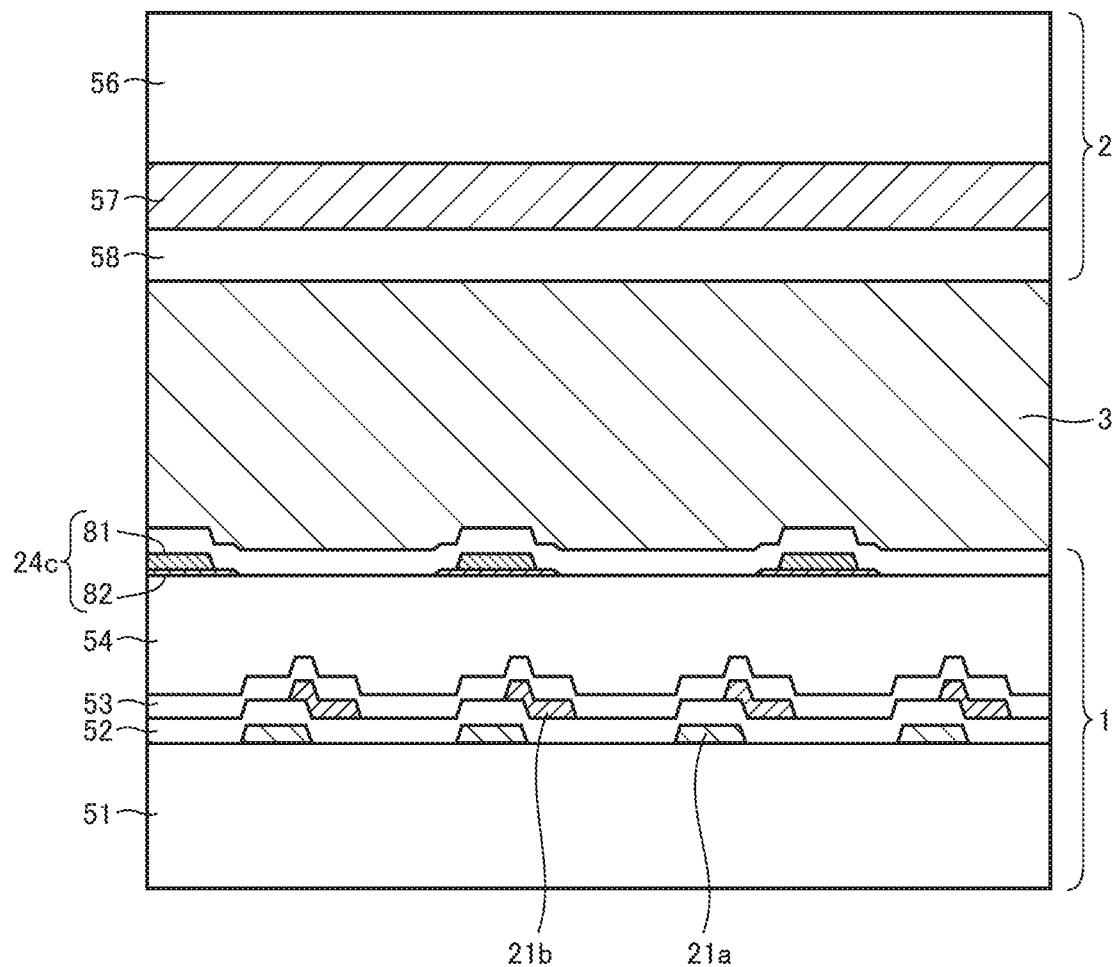
FIG. 9 is a cross-sectional view taken along a cutting-plane line IX-IX in FIG. 8.

FIG. 8 is an enlarged plan view illustrating, in a sealing area 20, an area that includes areas where first connection lines 21a and 21b and the second connection lines 24c are partially superposed, when viewed in a plan view, in Embodiment 3. FIG. 9 is a cross-sectional view taken along a cutting-plane line IX-IX in FIG. 8.

In the present embodiment, as illustrated in FIG. 9, each of the second connection lines 24c is formed in a two-layer configuration, composed of a metal film 81 and a transparent conductive film 82. More specifically, under the metal film 81, the transparent conductive film 82 is formed. The metal film 81 is a film of an opaque metal having low light permeability, for example, copper, titanium, molybdenum, aluminum, chromium, or the like, or alternatively, an alloy of any of these. The transparent conductive film 82 is made of, for example, ITO. The material of the transparent conductive film 82, however, is not limited to ITO, but may be made of another transparent conductive material such as IZO. Since the transparent conductive films 82 are formed in the same layer as the layer of the pixel electrodes, the transparent conductive films 82 can be formed into a pattern by using the same material as that for the pixel electrodes, through the same step.

Further, as is the case with the second connection lines 24c, each of the touch sensor lines 14 formed in the third line layer is formed in a two-layer configuration composed of a metal film and a transparent conductive film.

The metal film 81 has a line width smaller than the line width of the transparent conductive film 82. For example, the metal film 81 has a line width of 3 μm, and the transparent conductive film 82 has a line width of 5 μm. These are merely exemplary values, and the transparent conductive film may have a line width of, for example, 5 μm or more (for example, 7 μm or more).

ITO has a resistance that is one order higher, compared with such a metal as copper or aluminum. In a case where all of the touch sensor lines 14 and the second connection lines 24c are formed with transparent conductive films made of such a material as ITO, therefore, the signal transmission properties deteriorate. In the present embodiment, however, each of the touch sensor lines 14 and the second connection lines 24c is formed in a two-layer configuration composed of the metal film 81 and the transparent conductive film 82, whereby light-transmitting parts are ensured, while the lines can be caused to have low resistance and excellent redundancy.

Here, by utilizing the redundancy, the configuration may be as follows: the metal films 81 of the second connection lines 24c in the sealing area 20 have a smaller line width (for example, 2 μm), and the metal films 81 in the area on an inner side with respect to the sealing area 20 (on the display area 10 side) have a greater line width (for example, 4 μm). By decreasing the line width of the metal films 81 in the sealing area 20, the light-transmitting areas S1 allowing light to be projected to the sealing member 3 can be made wider. Further, by increasing the line width of the metal films 81 in the area on the inner side with respect to the sealing area 20, the resistance can be reduced, and the occurrence of a disconnection to the metal films 81 can be suppressed, whereby the yield at the time of manufacture can be improved.

Embodiment 4

Figure 10:
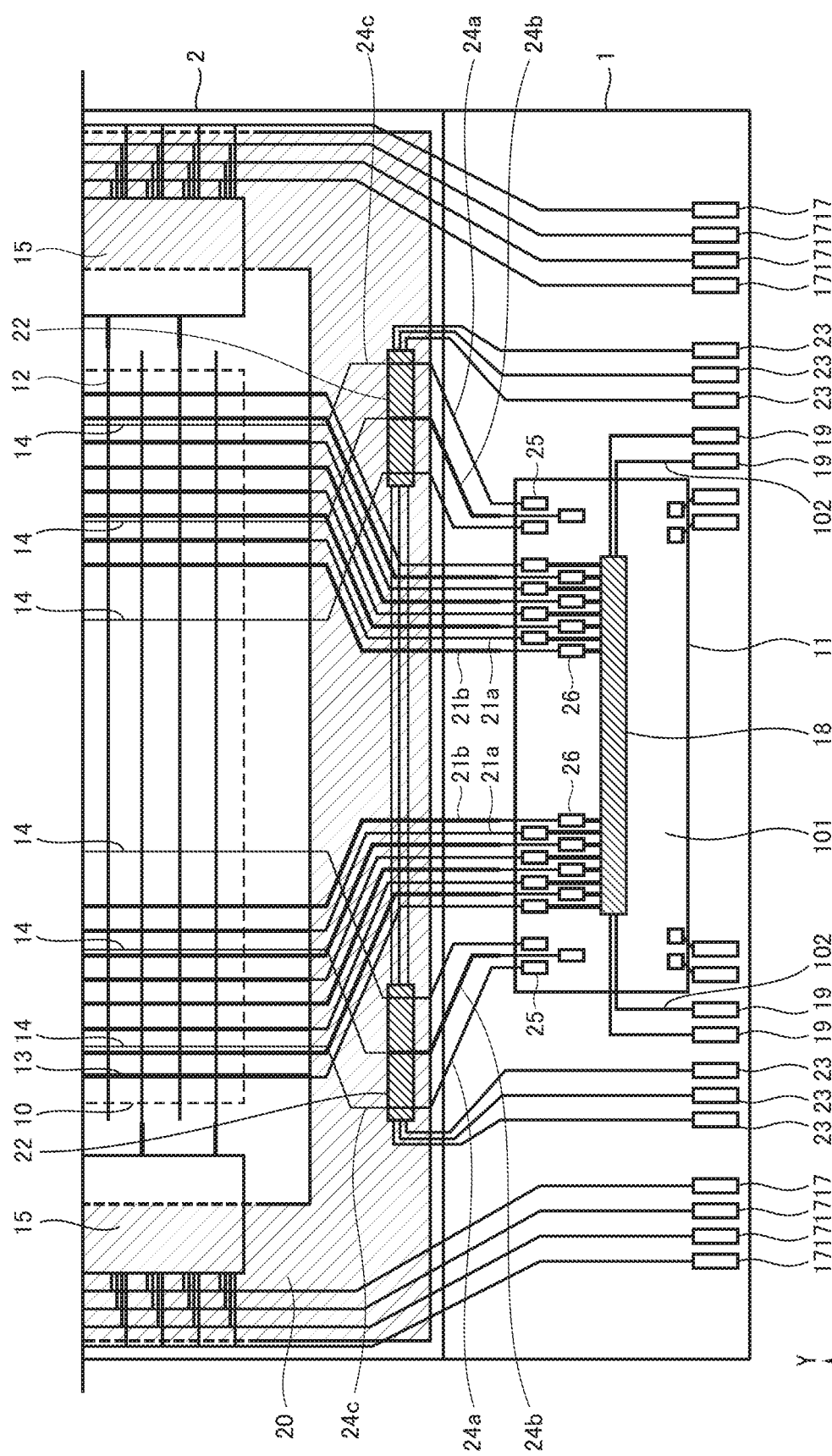
FIG. 10 is a plan view illustrating a position at which a source line inspection pattern is arranged, in Embodiment 4.

FIG. 10 is a plan view illustrating a position at which a source line inspection pattern 18 is arranged, in Embodiment 4. In FIG. 10, the same constituent portions as those in FIG. 3 are denoted by the same reference numerals. In Embodiment 1, the source line inspection pattern 18 is formed inside the sealing area 20, but in the present embodiment, the same is formed in an area 101 where the driving circuit 11 is mounted. More specifically, the source line inspection pattern 18 is formed on a side opposite to the first connection lines 21a, 21b with respect to the source line signal output terminals 26, so that the source line signal output terminals 26 are interposed therebetween.

According to the configuration in which the source line inspection pattern 18 is provided in the area 101 where the driving circuit 11 is mounted, there is no need to arrange the source line inspection pattern 18 in an area close to the display area 10, which makes it possible to reduce the frame area. Besides, there is no need to arrange, in the sealing area 20, lines 102 for connecting the source line inspection pattern 18 and the source line inspection signal input terminal 19 with each other, which makes it possible to improve the degree of freedom in the layout of the connection lines (the first connection lines 21a, 21b, the second connection lines 24c).

In a case where the source line inspection pattern 18 is formed in an area close to the display area 10 as illustrated in FIG. 3, there is a part in which a disconnection of the connection lines cannot be detected (the space between the source line inspection pattern 18 and the source line signal output terminals 26). With the configuration of the present embodiment, however, a disconnection of the connection lines between the source line inspection pattern 18 and the source line signal output terminals 26 can be detected.

Incidentally, in the configuration illustrated in FIG. 10, the touch sensor inspection patterns 22 are not arranged in the area 101 where the driving circuit 11 is mounted. With this configuration, an area under the touch sensor signal output terminals 25 in the drawing (an area on a side opposite to the second connection lines 24a, 24b with respect to the touch sensor signal output terminals 25) can be also used as an area where the source line inspection pattern 18 is arranged. This allows the source line inspection pattern 18 to be arranged in an area wider in the X axis direction, thereby making it possible to suppress a defect such as a disconnection and a short circuit inside the source line inspection pattern 18. Besides, this makes it possible to inspect a high-definition display device having a greater number of the source lines 13.

<Modification Configuration of Embodiment 4>

Figure 11:
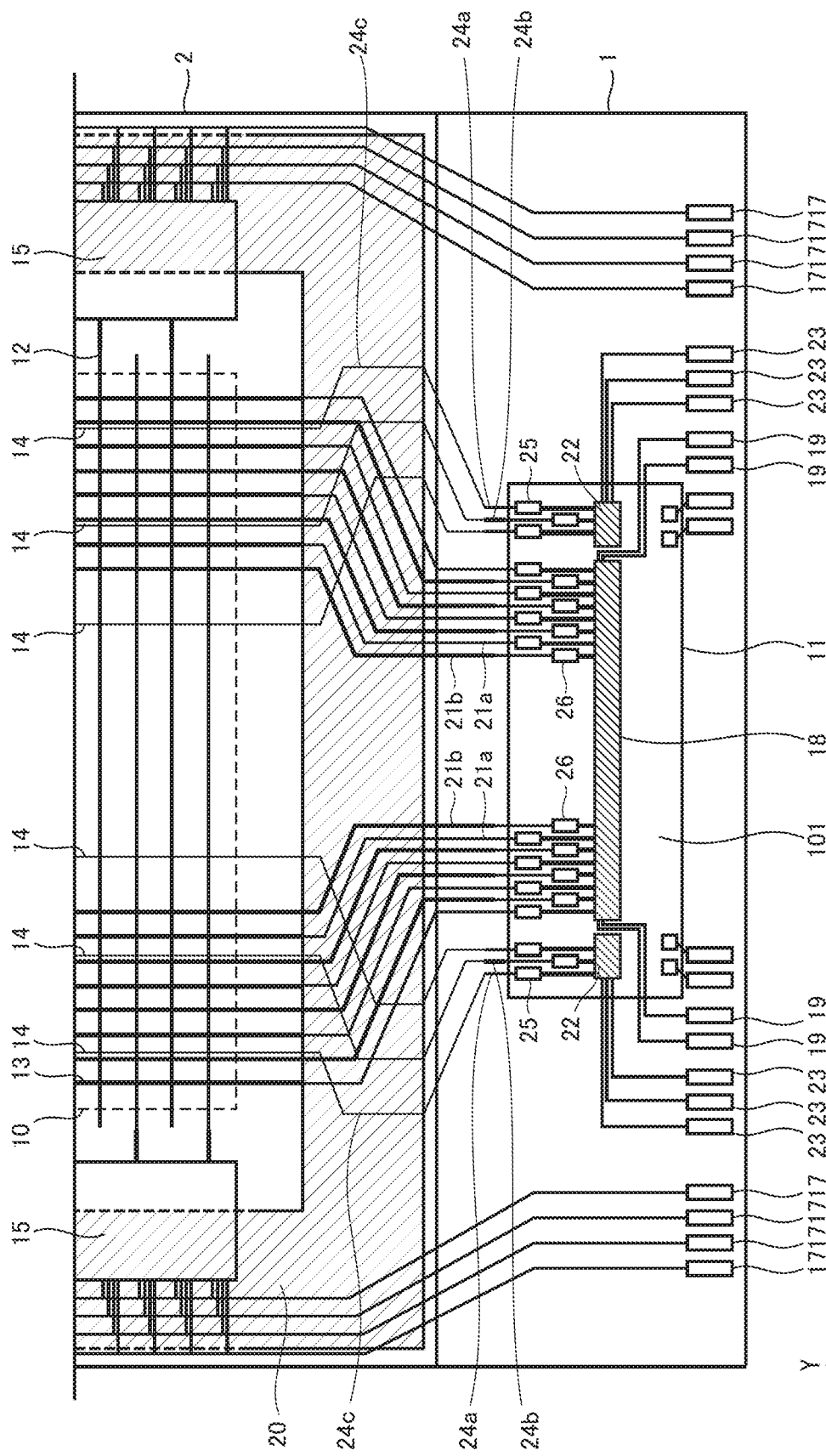
FIG. 11 is a plan view illustrating positions at which a source line inspection pattern and touch sensor inspection patterns are arranged, in Modification Configuration of Embodiment 4.

FIG. 11 is a plan view illustrating positions at which a source line inspection pattern 18 and touch sensor inspection patterns 22 are arranged, in Modification Configuration of Embodiment 4. In FIG. 11, the same constituent portions as those in FIGS. 3 and 10 are denoted by the same reference symbols, respectively. In this Modification Configuration example, not only the source line inspection pattern 18 but also the touch sensor inspection patterns 22 are formed in the area 101 where the driving circuit 11 is mounted. More specifically, the touch sensor inspection patterns 22 are formed on a side opposite to the second connection lines 24a, 24b with respect to the touch sensor signal output terminals 25. In other words, the second connection lines 24c are reconnected with the second connection lines 24a or the second connection lines 24b, in an area on a side opposite to the display area 10 with respect to the sealing area 20.

According to this configuration, the second connection lines 24c formed in the third line layer are reconnected to the second connection lines 24a formed in the first line layer, or to the second connection lines 24b formed in the second line layer, in the region where the counter substrate 2 is not present. This makes it possible to ensure a wider area as an area where the first connection lines 21a, 21b are formed, as compared with the configuration in which the second connection lines 24c are reconnected to the second connection lines 24a or the second connection lines 24b in the sealing area 20.

More specifically, in the configuration in which the second connection lines 24c are reconnected to the second connection lines 24a or the second connection lines 24b in the sealing area 20 (see FIG. 3), the second connection lines 24a exist in the first line layer, in which first connection lines 21a are formed, and the second connection lines 24b exist in the second line layer, in which the first connection lines 21b are formed. According to the configuration illustrated in FIG. 11, however, the second connection lines 24 arranged in the sealing area 20 are only the second connection lines 24c formed in the third line layer. This makes it possible to widen the spaces between the first connection lines 21a, 21b and to reduce the frame area.

In a case where the source line inspection pattern 18 and the touch sensor inspection patterns 22 are formed in the area 101 where the driving circuit 11 is mounted, the area where they are formed is limited to the size of the driving circuit 11. In a case where the driving circuit 11 has a width narrower than the width of the display area 10, it is necessary to, for example, arrange switching elements (inspection TFTs) in a staggered manner over a plurality of rows.

Figure 12:
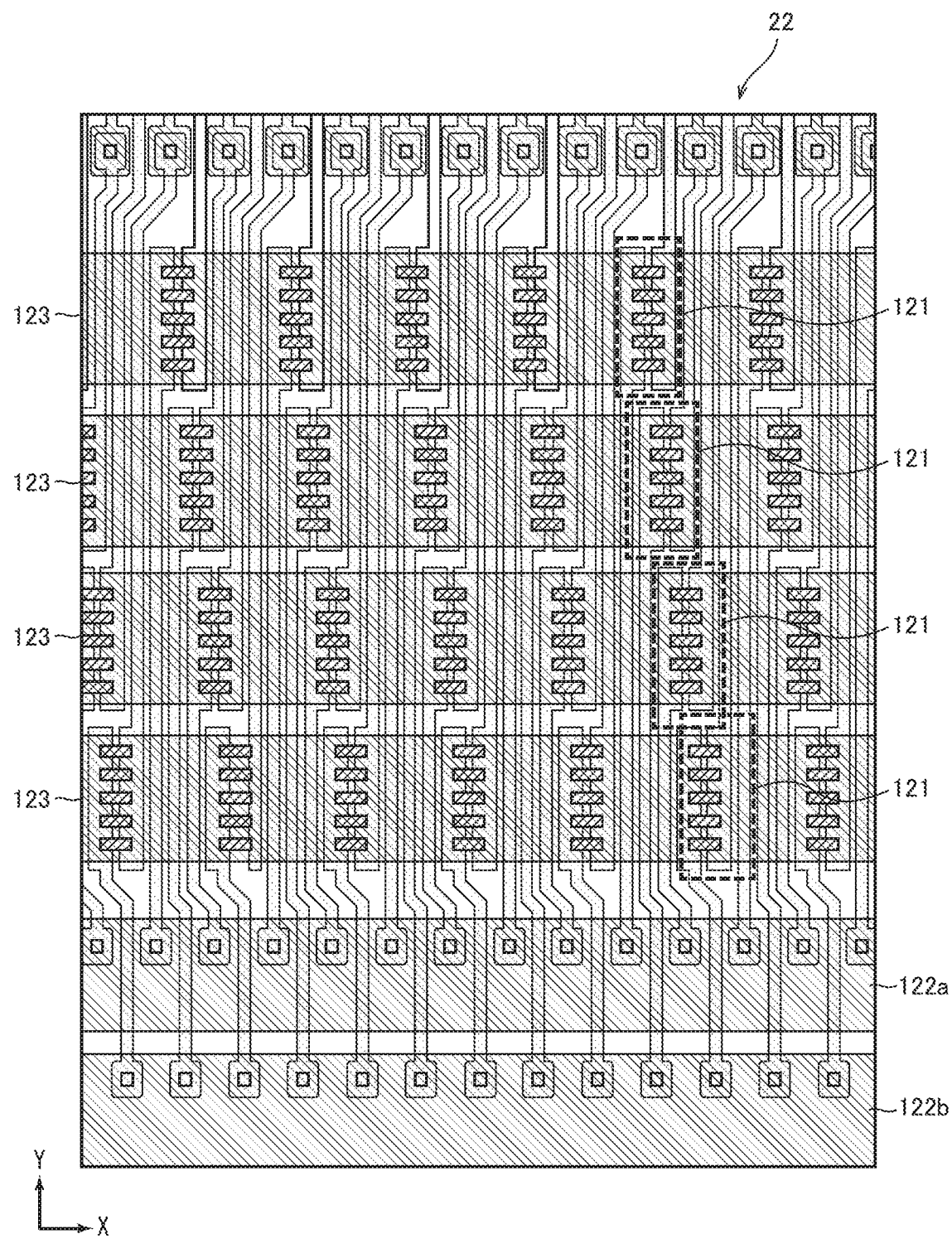
FIG. 12 is an enlarged view illustrating the touch sensor inspection pattern.

FIG. 12 is an enlarged view illustrating the touch sensor inspection pattern 22. In the example illustrated in FIG. 12, a plurality of switching elements (inspection TFTs) 121 included in the touch sensor inspection pattern 22 are arranged in a staggered manner over four rows. Though the illustration is omitted, a plurality of switching elements (inspection TFTs) included in the source line inspection pattern 18 are similarly arranged in a staggered manner over a plurality of rows.

Here, the following description describes an exemplary inspection method for detecting a disconnection or a short circuit of the touch sensor lines 14 and the second connection lines 24. First of all, a voltage is applied to the counter electrodes 31 from the first common line 122a and/or the second common line 122b through predetermined touch sensor lines 14, so that a specific pattern is displayed. One of adjacent ones of the touch sensor lines 14 is connected with the first common line 122a through the switching element 121, and the other is connected with the second common line 122b through the switching element 121. Whether or not the specific pattern is normally displayed is confirmed by visual inspection by an inspector, or by image processing, whereby a disconnection or a short circuit is detected. When this inspection is performed, a reference potential is supplied to the pixel electrodes by using the gate driver 15 and the source line inspection patterns 18.

Examples of the specific pattern include a stripe pattern, and a checkered pattern. The stripe pattern is such a display pattern that the pixels corresponding to the counter electrodes 31 arranged over a plurality of rows are caused to display white and black alternately row by row. The checkered pattern is such a display pattern that, among the pixels corresponding to the counter electrodes 31 arranged in matrix, one pixel that corresponds to either one of two adjacent ones of the counter electrodes in any direction of the row direction and the column direction performs white display, and one pixel that corresponds to the other of the two adjacent counter electrodes performs black display. Here, the white display is such a display that light from a light source (backlight) arranged on the back side of the display device (on the glass substrate side of the active matrix substrate 1) is allowed to pass therethrough, and the black display is such a display that the light from the light source is not allowed to pass therethrough.

In order to display a stripe pattern or a checkered pattern, only at least two common lines 122 connected to the switching elements 121 may be sufficient, as is the case with the first common line 122a and the second common line 122b illustrated in FIG. 12. In FIG. 12, in addition to the first common line 122a and the second common line 122b, turning ON/OFF control lines 123 for controlling the turning ON/OFF of the switching elements 121 are illustrated. During the inspection, the same signal is input to the turning ON/OFF control lines 123.

By increasing the number of common lines 122 for inputting inspection signals to the switching element 121, various patterns can be displayed, which allows the inspection accuracy to improve. For example, if the common lines 122 are increased to four, a short circuit between adjacent lines formed in the same line layer can be detected. On the other hand, if the common lines 122 are increased in number, areas for arranging the same have to be ensured, and there is a possibility that the frame cannot be made narrower or the layout regarding the connection line width becomes difficult. The number of the common lines 122, therefore, is appropriately set according to the FPC terminal area, the outer shape of the liquid crystal display (the size of the frame area), and the like.

The above-described embodiment is merely an example for implementing the present invention. The present invention, therefore, is not limited to the above-described embodiment, and the above-described embodiment can be appropriately varied and implemented without departing from the spirit and scope of the invention. For example, technical characteristics of the respective embodiments and the modification configurations of the embodiments can be appropriately combined.

Each embodiment described above is described with reference to an exemplary configuration in which the display device 100 is a liquid crystal display having a touch sensor function, but the display device is not limited to a liquid crystal display having a touch sensor function. For example, the display device 100 may be an organic electroluminescence (organic EL) display that does not incorporate a touch panel. In the case where the display device 100 is an organic EL display, the first lines can correspond to the gate lines, the second lines can correspond to the source lines, and the third lines can correspond to the lines that supply an electric current to the organic EL layer during a light emission period. For example, the gate bus lines 113, the data bus lines 112, and the light emission control lines 121 in an active matrix type organic EL display in Embodiment 8 disclosed in WO 2013/157285 can correspond to the first lines, the second lines, and the third lines, respectively.

In each of the above-described embodiments, each gate line 12 extends in the X axis direction, and a plurality of the same are arrayed in the Y axis direction; and each source line 13 extends in the Y axis direction, and a plurality of the same are arrayed in the X axis direction. The configuration, however, may be such that each gate line 12 extends in the Y axis direction, and a plurality of the same are arrayed in the X axis direction; and each source line 13 extends in the X axis direction, and a plurality of the same are arrayed in the Y axis direction.

Each of the above-described embodiments is described with reference to an example in which the first lines are the gate lines 12, the second lines are the source lines 13, and the third lines are the touch sensor lines 14, but the first to third lines are not limited to these lines.

In the configuration described above, the driving mode for driving the liquid crystal molecules contained in the liquid crystal layer of the liquid crystal display is the horizontal electric field driving mode for horizontal alignment, such as the IPS mode or the FFS mode, but the mode may be another mode. For example, the driving mode may be a horizontal electric field driving mode for driving liquid crystal with negative dielectric anisotropy, using vertical alignment films.

Here, as a method for aligning liquid crystal, a method involving forming an alignment support layer on an alignment film is known, wherein the alignment support layer is made of a polymer. In liquid crystal displays of the VA mode (vertical alignment mode), this has been practically implemented as, for example, the polymer sustained alignment (PSA) technique. More specifically, photopolymerizable monomers are added in liquid crystal, and in a state in which a voltage is being applied to the liquid crystal (in a state in which liquid crystal molecules are tilted from the vertical direction), the monomers are polymerized with light or heat. Here, on an alignment film (a vertical alignment film in the case of the VA mode), a polymer layer is formed that causes the direction of initial alignment of liquid crystal molecules to be tilted slightly (2 to 3 degrees) from the vertical alignment direction.

The alignment method using such a polymer is used in the case of the horizontal electric field driving mode such as the IPS mode or the FFS mode. In the case of the horizontal electric field driving mode, polymer is formed on a horizontal alignment film to which an alignment treatment is applied by rubbing or light alignment, but the polymerization of the monomer is performed in a state I which no voltage is applied to liquid crystal. If charges are accumulated in pixel electrodes or counter electrodes during this polymerization, the polymerization is achieved with liquid crystal being in an unfavorable alignment state, which leads to display irregularities or the reduction of the contrast. To cope with this, the switching elements 121 included in the touch sensor lines 14, the second connection lines 24, and the touch sensor inspection patterns 22 can be used so as to disperse charges in the pixel electrodes or the counter electrodes 31, so that any voltage should not be applied to the liquid crystal. In other words, the switching elements 121 included in the touch sensor lines 14, the second connection lines 24, and the touch sensor inspection patterns 22 can be used, not only for inspecting a disconnection, a short circuit, or the like in the touch sensor lines 14 and the second connection lines 24, but also for dispersing charges in the above-described pixel electrodes or the counter electrodes 31.

The touch position detection method is the method of a so-called self-capacitance type, but may be the method of a mutual capacitance type. In other words, the present invention can be applied to a display device of the mutual capacitance type, having a function of detecting a touch position.

A specific pattern displayed during inspection is not limited to the above-described stripe pattern or checkered pattern.

In the configuration described above, the source lines 13 are provided within the display area 10, and the first connection lines 21 connected with the source lines 13 are provided in the non-display area. The source lines 13, however, may have such a length that the source lines 13 are arranged not only inside the display area 10 but also in the non-display area. Further, the foregoing description discusses that the source lines 13 are connected through the first connection lines 21 with the source line signal output terminals 26, but all of the source lines 13 and the first connection line 21 can be referred to as source lines, without distinction. The same holds for the gate lines 12 and the touch sensor lines 14.

DESCRIPTION OF REFERENCE NUMERALS

1: active matrix substrate
2: counter substrate
3: sealing member
10: display area
11: driving circuit
12: gate line
13: source line
14: touch sensor line
18: source line inspection pattern
20: sealing area
21a, 21b: first connection line
22: touch sensor inspection pattern
23: touch sensor inspection signal input terminal
24a, 24b, 24c: second connection line
25: touch sensor signal output terminal
26: source line signal output terminal
81: metal film
82: transparent conductive film
100: display device

The invention claimed is:
1. A display device comprising:
an active matrix substrate;
a counter substrate opposed to the active matrix substrate;

a display function layer arranged between the active matrix substrate and the counter substrate; and a sealing member that is made of a material that is cured when irradiated with light, and seals the display function layer between the active matrix substrate and the counter substrate, wherein the active matrix substrate includes:
  first lines formed in a first line layer;
  second lines formed in a second line layer that is different from the first line layer;
  third lines formed in a third line layer that is different from the first line layer and the second line layer, a signal that is different from a signal supplied to the first lines and the second lines being supplied to the third lines;
  first terminals electrically connected to the first lines or the second lines;
  second terminals electrically connected with the third lines;
  first connection lines that connect the first lines or the second lines with the first terminals; and
  second connection lines that connect the third lines with the second terminals, wherein one of two of the first connection lines that are connected, respectively, to two adjacent ones of the first lines or two adjacent ones of the second lines is formed at least partially in one of the first line layer and the second line layer, and the other of the two of the first connection lines is formed at least partially in the other one of the first line layer and the second line layer, the first connection lines and the second connection lines are partially superposed on each other in a sealing area where the sealing member is arranged, when viewed in a plan view, and in areas that are in the sealing area and where the first connection lines and the second connection lines are superposed, the two of the first connection lines are at least partially superposed when viewed in a plan view.

2. The display device according to claim 1,
wherein, in the areas that are in the sealing area and where the first connection lines and the second connection lines are superposed, the two of the first connection lines are superposed over the full width thereof when viewed in a plan view.

3. The display device according to claim 1,
wherein the active matrix substrate further includes an insulating film provided between the first connection lines and the second connection lines, in an area where the first connection lines and the second connection lines are superposed when viewed in a plan view, and
the insulating film is an organic film.

4. The display device according to claim 1,
wherein the active matrix substrate further includes a plurality of touch sensor electrodes, and
the third lines are connected with the touch sensor electrodes.

5. The display device according to claim 1,
wherein the two of the first connection lines have a line width of 3 µm, and the two of the first connection lines are at least partially superposed over 2 µm or more when viewed in a plan view.

6. The display device according to claim 1,
wherein the third lines and the second connection lines are at least partially formed with transparent conductive films.

7. The display device according to claim 6,
wherein the third lines and the second connection lines are at least partially formed with laminates of a metal film and the transparent conductive film, and
the metal film has a line width smaller than a line width of the transparent conductive film.

8. The display device according to claim 1,
wherein the active matrix substrate further includes first connection line switching elements electrically connected with the first terminals, and
the first connection line switching elements are arranged on a side opposite to the first connection lines with respect to the first terminals, so that the first terminals are interposed therebetween.

9. The display device according to claim 8,
wherein the active matrix substrate further includes second connection line switching elements electrically connected with the second terminals, and
the second connection line switching elements are arranged on a side opposite to the second connection lines with respect to the second terminals, so that the second terminals are interposed therebetween.

10. The display device according to claim 1,
wherein, in a space between the sealing area and the second terminals, the second connection lines are at least partially formed in the first line layer or the second line layer.

11. The display device according to claim 10,
wherein a boundary between the parts of the second connection lines formed in the third line layer and the parts of the same formed in the first line layer or the second line layer is present in an area on a side opposite to a display area with respect to the sealing area.

12. The display device according to claim 10,
wherein, in a space between the sealing area and the second terminals, two adjacent ones of the second connection lines are at least partially formed in the first line layer and the second line layer, respectively, so that the second connection lines are at least partially formed in the first line layer and the second line layer alternately.

13. The display device according to claim 12,
wherein the parts of the two adjacent ones of the second connection lines formed in the first line layer and the second line layer alternately are at least partially superposed when viewed in a plan view.

14. The display device according to claim 12,
wherein a boundary between the parts of the second connection lines formed in the third line layer and the parts of the same formed in the first line layer or the second line layer is present in the sealing area, or in an area between the sealing area and a display area.

15. The display device according to claim 14,
wherein the active matrix substrate further includes second connection line switching elements that are formed at the boundary between the second connection lines formed in the third line layer and the second connection lines formed in the first line layer or the second line layer.

* * * * *